(12) United States Patent
Jagannathan et al.

(10) Patent No.: US 9,704,414 B2
(45) Date of Patent: Jul. 11, 2017

(54) BLIND AID DEVICE

(71) Applicant: New York University, New York, NY (US)

(72) Inventors: Ramesh Jagannathan, Abu Dhabi (AE); Jad Mahmoud, Abu Dhabi (AE); Nahal Mustafa, Abu Dhabi (AE); Matthew Brent Karau, Abu Dhabi (AE); Noha Alfergani, Abu Dhabi (AE); Brenda Odhingo, Abu Dhabi (AE)

(73) Assignee: NEW YORK UNIVERSITY, New York, NY (US)

( * ) Notice: Subject to any disclaimer, the term of this patent is extended or adjusted under 35 U.S.C. 154(b) by 193 days.

(21) Appl. No.: 14/596,045

(22) Filed: Jan. 13, 2015

(65) Prior Publication Data

US 2015/0199918 A1    Jul. 16, 2015

Related U.S. Application Data

(60) Provisional application No. 61/927,859, filed on Jan. 15, 2014.

(51) Int. Cl.
*G09B 21/00* (2006.01)
*G06F 3/01* (2006.01)

(52) U.S. Cl.
CPC .......... *G09B 21/003* (2013.01); *G06F 3/017* (2013.01)

(58) Field of Classification Search
CPC .......................... G02B 27/017; G06K 9/00335
USPC ......................................................... 340/4.12
See application file for complete search history.

(56) References Cited

U.S. PATENT DOCUMENTS

2010/0308999 A1\* 12/2010 Chornenky .............. G08B 6/00
340/573.1
2012/0092460 A1\* 4/2012 Mahoney ........... G06K 9/00664
348/46

\* cited by examiner

*Primary Examiner* — Vernal Brown
(74) *Attorney, Agent, or Firm* — Foley & Lardner LLP

(57) ABSTRACT

A blind aid device designed for non-verbal communication between a blind person and a companion includes a body-worn sensor system to be worn by the companion, a body-worn actuation system to be worn by the blind person and a wireless communication link between the body-worn sensor system and the wearable body-worn actuation system. The body-worn sensor system includes a gyroscope configured to detect and record a velocity of tilting and turning head movements of the companion, an accelerometer configured to detect and record an extent of the tilting head movements of the companion, and a magnetic compass sensor configured to detect and record an extent of the turning head movement of the companion. The wearable body-worn actuation system includes an array of control electronics and actuators configured to translate electronic signals transmitted from the body-worn sensor system into physical movements, in real time.

19 Claims, 5 Drawing Sheets

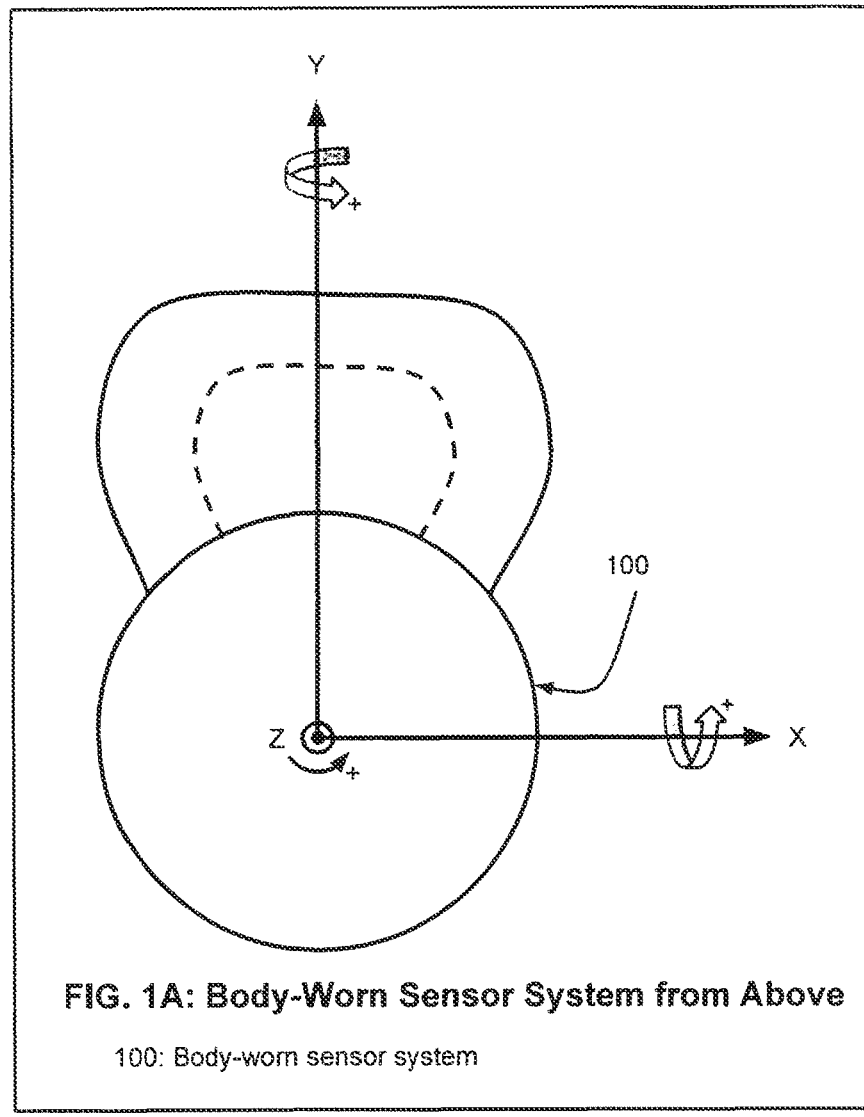
FIG. 1A: Body-Worn Sensor System from Above
100: Body-worn sensor system

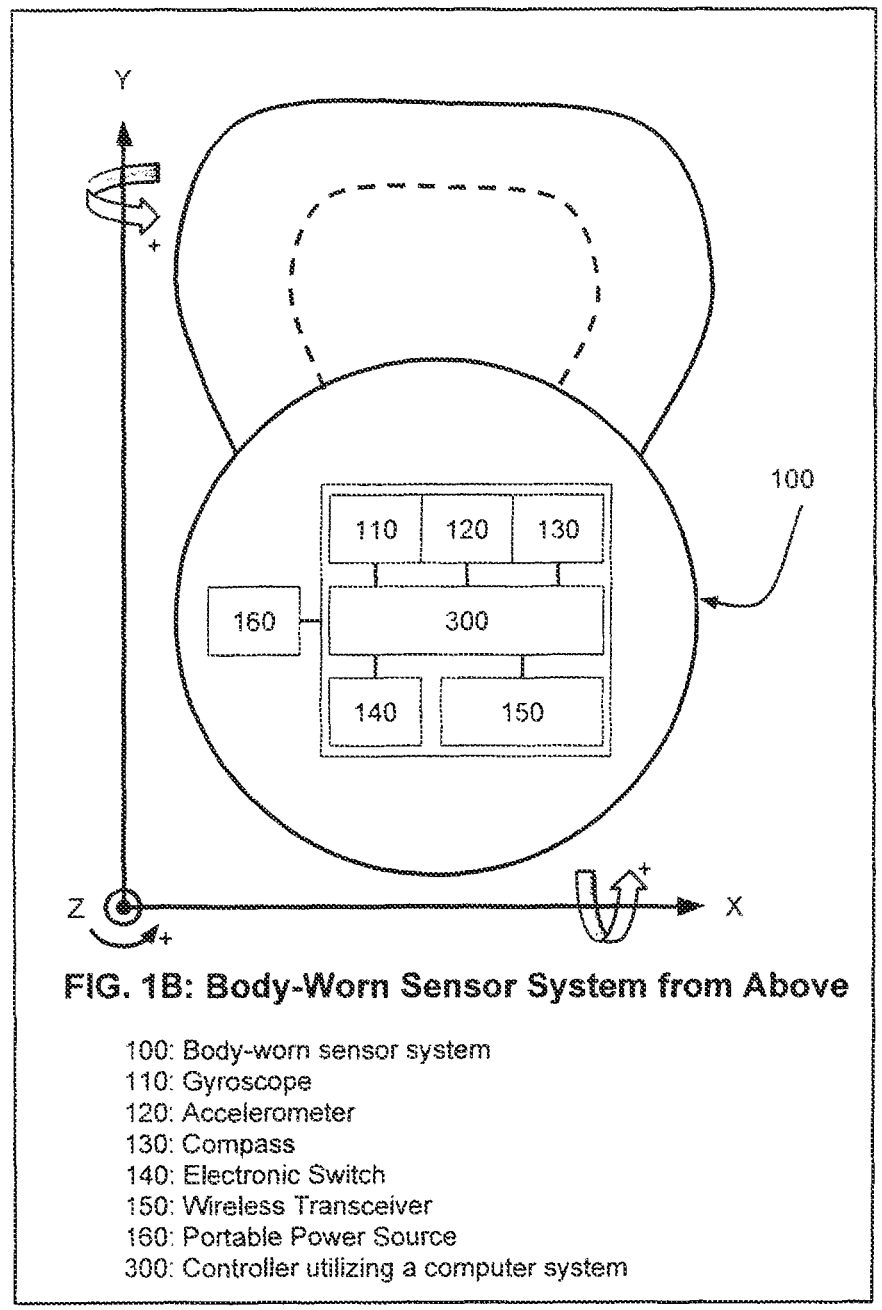
FIG. 1B: Body-Worn Sensor System from Above
100: Body-worn sensor system
110: Gyroscope
120: Accelerometer
130: Compass
140: Electronic Switch
150: Wireless Transceiver
160: Portable Power Source
300: Controller utilizing a computer system

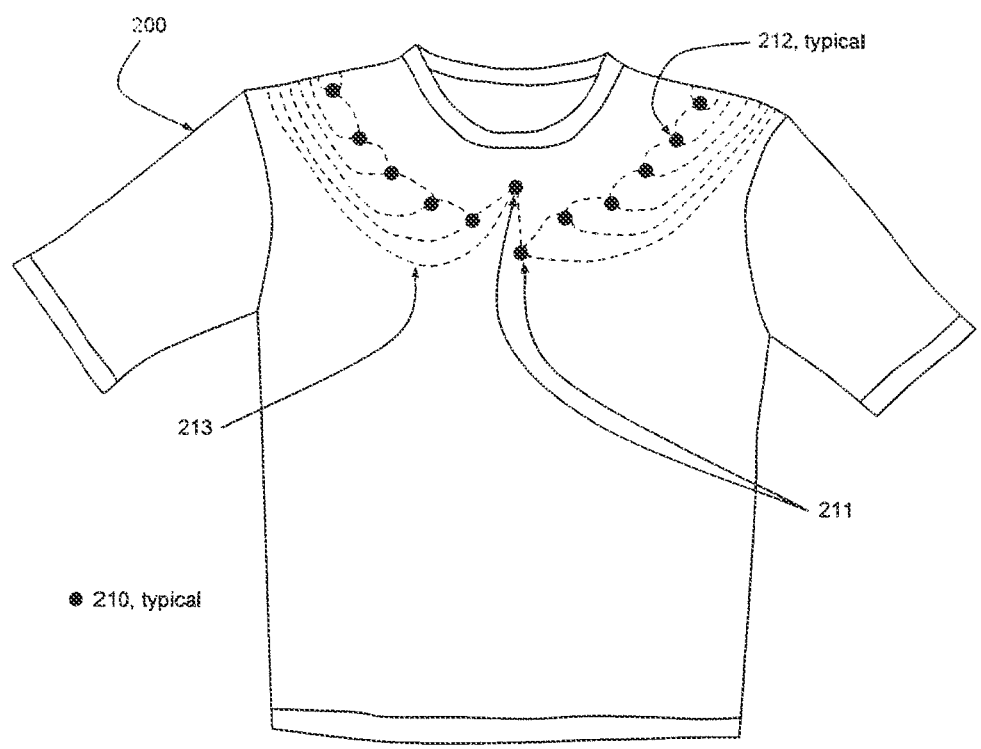
FIG. 2A: Front
200: Body-worn Actuation System
210: Array of Actuators (12)
211: Vertical Actuators (2)
212: Horizontal Actuators (10)
213: Conductive Thread

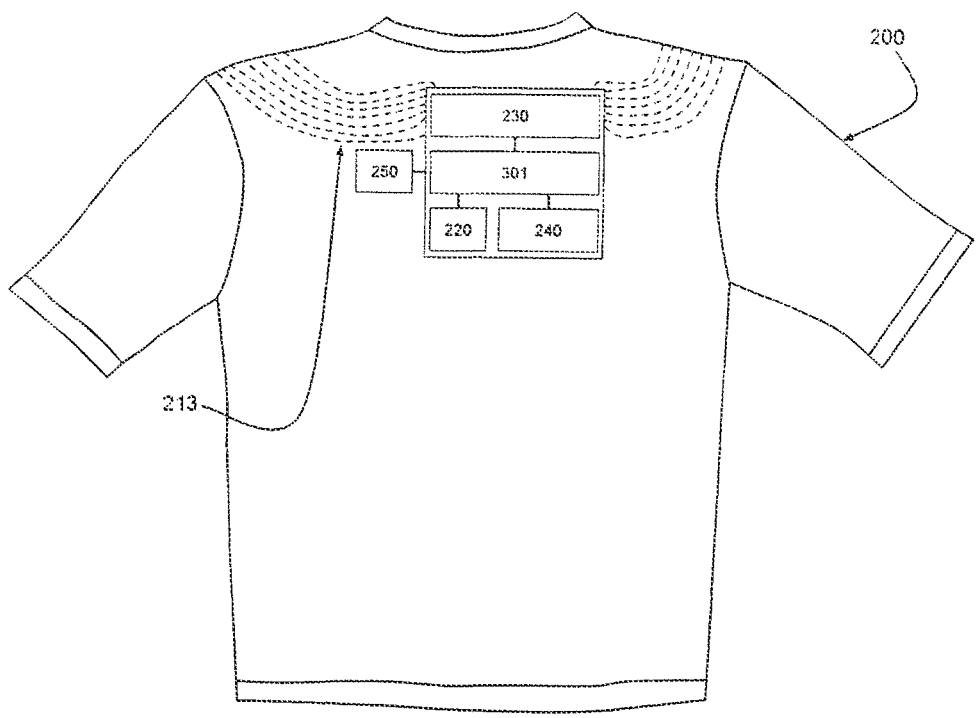
FIG. 2B: Back
200: Body-worn Actuation System
213: Conductive Thread
220: Electronic Switch
230: Actuator Control Electronics
240: Wireless Transceiver
250: Portable Power Source
301: Controller utilizing a computer system, Fig. 3

BLIND AID DEVICE

CROSS-REFERENCE TO RELATED APPLICATIONS

This application claims priority to U.S. Provisional Application No. 61/927,859 filed Jan. 15, 2014, reference of which is hereby incorporated in its entirety.

FIELD OF THE INVENTION

The present invention relates generally to the field of blind aids to help users who have recently lost their sense of sight to better orient to their surroundings. More specifically, the present invention relates to a system and method for enabling and enhancing the sensory perception of directionality of communication during social interactions of users who have recently lost their sense of sight.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Loss of sight is accompanied by difficulty in understanding spoken word, as a person who has recently lost his sense of sight is not accustomed to perceiving and summing the direction of the source of sounds. An acute aspect of the transitional state of a person who has recently lost his sense of sight relates to the person's ability to fit in with normal social situations, without feeling uncomfortable or left out. For instance, it is not uncommon in social interaction situations that someone would talk to a blind person, especially one who has only recently lost his sense of sight, without calling out his name. Under such conditions, the blind person would not know that he is being addressed, which could lead to an awkward situation. An important part of a social interaction or group conversation is to focus on the person speaking at any given time. For a blind person, especially one who has recently lost his sense of sight, this may be very difficult if not impossible to do.

The following are hypothetical examples of social interactions that can make a blind person feel uncomfortable or left out.

EXAMPLE 1

This example addresses the daily life of a college student living in a college dorm environment. It is well known that most of the hours of a student's day are spent in social gatherings of various natures, such as group studying, extra-curricular activities, dining in groups, etc. An important aspect of the group dynamic is the sense of belonging to a group. If, for some reason, Student A loses her sight, the following scenario can be envisioned: Student A is in a restaurant with a group of ten friends, sitting close to the center of the table. At dinner, it is common to encounter multiple simultaneous conversations being carried out around the table. For example, there may be three different conversations simultaneously occurring at the table. Student A may have difficulty identifying the responses corresponding to conversation 1, 2, or 3. The confusion created in such a situation may result in Student A feeling overwhelmed, and thus, disconnecting herself from all of the conversations. It may also result in the companion of Student A or the person sitting directly next to Student A disconnecting himself from the group conversation in order to focus on attending to Student A's needs.

EXAMPLE 2

This example addresses a social situation in which two friends are out walking together. While shopping, it is common to observe a situation in which the companion encounters a person, an item or an event that captures his attention. If, for some reason, Person B loses her sight, the following scenario can be envisioned: Person B and her companion are strolling down the marketplace. In the case where the companion encounters another person, engages in a brief exchange of greetings, and moves on, the blind person is essentially left out of this encounter. This can happen repetitively, leading to a more acute emotional situation for the blind person, who is just a passive participant in such encounters. In the case where the companion encounters an event that captures his interest, Person B may be oblivious to it, and thus, remains a passive participant.

EXAMPLE 3

This example addresses a social situation where a number of people are gathered for a special occasion. It is common in such gatherings for people to look at someone and initiate conversation without specifically calling out their name. If, for some reason, Person C loses his sight, the following scenario can be envisioned: Person C is attending a family gathering. Like Example 1, there may be multiple conversations simultaneously occurring, and Person C may have difficulty identifying the responses corresponding to each conversation. Failure of Person C to respond naturally and seamlessly to this situation may result in extreme awkwardness among the group.

Many inventions available on the market and directed to blind aids are geared towards addressing the navigational challenges of a blind person. However, almost none of them address the emotional needs of and challenges faced by the blind person, as he or she gets acclimated to his or her new way of life (i.e., during a short term, transitional period of adjustment).

EP 2371339 A1 is directed to a device intended to have a role of the "virtual view" to help blind persons to better orient and navigate through and within their environments; to read text, and recognize people, objects, and environmental circumstances or conditions. The device is comprised of a pair of eye glasses with a built in camera in the front and ear phones on one side. The device further includes a blind cane with a built in signal processing chip, a special alarm handle, a replaceable battery and an on/off button. After the device is switched ON, the image is streamed continuously and processed by digital signal processing system and a video coder. The image of any text, face or other recognized objects is translated into voice speech. Through the voice speech and an impulse in the handle, the blind person keeps alert of his surroundings. In other words, the device will convert video signal from the prospective viewpoint (miniature camera built in to glasses) of the blind person, into a corresponding voice explanation of the recognized text, persons and other objects, transmitting it to the user via ear phone. The disadvantage of such a device is that it provides an alert only to objects facing the blind person directly (i.e., any objects that can be seen by the camera placed in the blind person's glasses). The device cannot alert the blind person to objects that are not visible to the camera (i.e., objects behind or to the periphery of the blind person).

U.S. Pat. No. 4,761,770 is directed to a method for processing a reflected echo signal which is received from an object and supplied to an ultrasonic binaural sensory aid and a blind aid which works according to such a method. The blind aid is comprised of a pulse generator, a sweep generator, earphones with stereo receivers incorporating a receiving unit and a signal processing unit. The method for using the blind aid includes detecting the envelop of amplified signals reflected from objects after an ultrasonic signal radiates over an area comprising a field of view, and then generating audio signals representing the detected objects. While the blind aid helps blind people identify the position of any object he faces, the blind aid does not account for human interaction. In addition, the blind aid only provides information regarding objects facing the blind person directly (i.e., whatever lies in the way of the blind person).

U.S. Patent Application Publication No. 2011/0092249 is directed to a blind aid device that enables a blind person to activate the blind aid device; capture one or more images related to the blind person's surrounding environment; detect moving objects from the one or more images captured; identify a finite number of spatial relationships related to the moving objects; analyze the one or more images within the blind aid device to classify the finite number of spatial relationships related to the moving objects corresponding to predefined moving object data; convert select spatial relationship information related to the one or more analyzed images into audible information; relay select audible information to the blind person; and notify the blind person of one or more occurrences predetermined by the blind person as actionable occurrences. The blind aid device includes an image capturing module, an image analysis module, a conversion module and a communication module. The blind aid device translates the spatial relationship information obtained from the one or many images taken by the device into audible information in order to inform the blind person about the stationary or moving objects that surround him/her. While the blind aid device helps blind people identify the nature of any moving or stationary object that surrounds them and obtain its spatial information, the blind aid device does not account for human interaction. In particular, the blind aid device might help the blind person detect the presence of a person an object in view, but it cannot identify different people. Therefore, if the blind person is present in a group of people having a conversation, the blind aid device will detect the people but it does not assist the blind person in determining who is addressing him or her.

U.S. Pat. No. 4,712,003 is directed to a blind person guide device comprising a walking stick, a source mounted on a front face of the walking stick for emitting a beam of infrared radiation in a forward direction, a photoelectric element mounted on the front face of the walking stick for receiving infrared radiation reflected from an object irradiated by the beam, an electric circuit for producing information as to a distance to the object based on the illuminance or energy of received radiation on the photoelectric element, an oscillator for generating electric vibrations having a frequency and an amplitude which are dependent on the distance information produced by the electric circuit, and a vibrator actuated in response to the electric vibrations and having a vibrating surface against which a human skin can be pressed. The blind person guide device can determine the distance between the blind person and an object (obstacle) facing him by detecting the intensity of the reflection of the infrared radiation transmitted to the object and translating this information to the blind person via a vibrating surface pressed on the skin of the blind person. While the blind person guide device may help blind people develop caution about their surroundings and be aware about the position of different obstacles, the blind person guide device does not account for human interaction. Furthermore, the blind person guide device cannot detect any existing objects behind the blind person or at a side that falls out of the reach of the radiation emitted by the device. In addition, the blind person guide device cannot help identify specific interactions within the surroundings.

A need exists for improved technology, including technology that may address the above described disadvantages. In particular, a need exists for improved technology of a blind aid device that enables and enhances the sensory perception of directionality of communication during social interactions of users who have recently lost their sense of sight.

SUMMARY

One embodiment of the invention relates to a blind aid device designed for non-verbal communication between a blind person and a companion. The blind aid device includes a body-worn sensor system to be worn by the companion, a body-worn actuation system to be worn by the blind person, and a wireless communication link between the two systems. The body-worn sensor system integrates a portable power source, a controller utilizing a computer system for signal processing and orchestrating wireless communication, a gyroscope configured to detect and record the velocity of tilting and turning head movements of the companion wearing the body-worn sensor system, an accelerometer configured to detect and record the extent of the head tilting movements of the companion, a magnetic compass sensor configured to detect and record the extent of turning head movements, and a wireless communication device configured to communicate sensor values to the body-worn actuation system. The body-worn actuation system includes a portable power source, a controller configured to utilize a computer system for signal processing and orchestrating wireless communication, a wireless communication device, and an array of control electronics and actuators configured to translate the electronic signals transmitted from the body-worn sensor system into physical movements, in real time Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The disclosure will become more fully understood from the following detailed description, taken in conjunction with the accompanying figures, in which:

FIGS. 1A and 1B are top views of illustrated implementations of a body-worn sensor system including a controller utilizing a computer system, a gyroscope, an accelerometer, a magnetic compass sensor, a portable power source, an electronic switch and a wireless communication device.

FIGS. 2A and 2B are illustrated implementations of a front and a back of a body-worn actuation system including a controller utilizing a computer system, vibrating actuators sewn below the neckline using conductive thread, a portable power source, control electronics, an electronic switch, and a wireless communication device.

DETAILED DESCRIPTION

Figure 3:
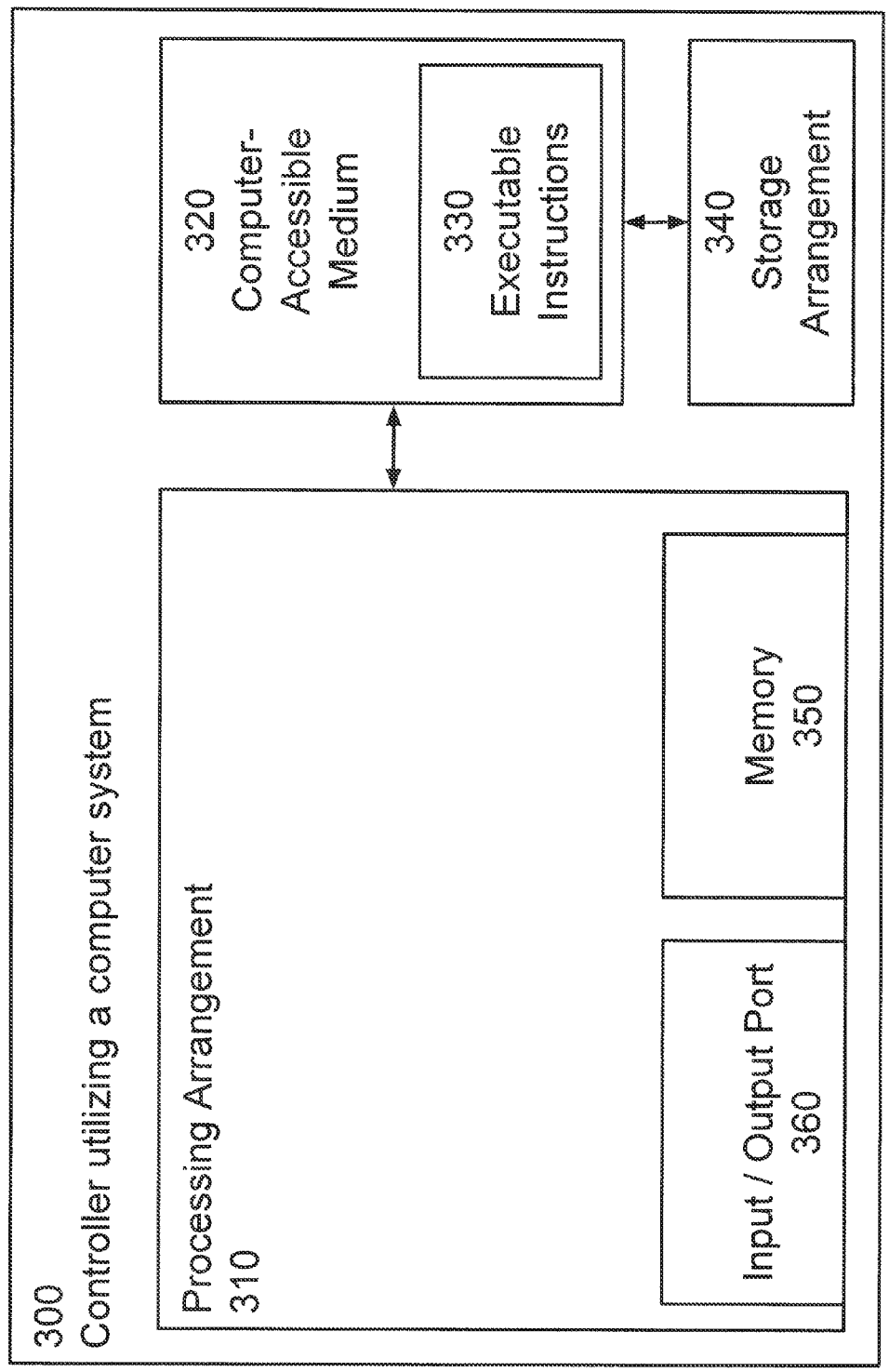
FIG. 3 illustrates one implementation of a controller utilizing a computer system.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to FIGS. 1 and 2, a blind aid device 1000 designed to facilitate non-verbal communication between a blind user and his companion includes a body-worn sensor system 100 to be worn by the companion and a body-worn actuation system 200 to be worn by the blind user.

Referring to FIGS. 1A and 1B, an illustrated implementation of the body-worn sensor system 100 is equipped with a sensor system including a gyroscope 110, an accelerometer 120 and a magnetic compass sensor 130. The body-worn sensor system 100 may also include at least one power source 160 configured to power the components of the body-worn sensor system 100. The power source 160 may include any combination of at least one single-use battery, at least one rechargeable battery, a system capable of generating or storing electrical power from the environment, temperature differentials, or harvested or stored kinetic or potential energy. The body-worn sensor system 100 may also include an electronic switch 140 configured to turn on and off a communication link 150 between the companion and the blind user. The switch 140 may be, for example, a pressure sensor, a capacitance sensor, or a manually operated switch. The body-worn sensor system 100 can be embedded within existing clothing items or fashion accessories or may be part of a custom-designed wearable device.

The gyroscope 110, the accelerometer 120 and the magnetic compass sensor 130 are each capable of measuring movement along an x-axis, a y-axis and a z-axis, resulting in the sensor system having nine degrees of freedom. Any combination of available gyroscope 110, accelerometer 120 and magnetic compass sensor 130 may be used, provided they are of a suitable size to be placed within the body-worn sensor system 100 and have sufficient sensitivity, resolution and data reporting rates to capture and record high-fidelity movements of the companion's body. The body-worn sensor system 100 may take the form of or be embedded in any type of body-worn accessory, for example, a hat, a helmet, glasses, sunglasses, earrings, a bracelet, a watch, etc. However, for a more natural appearance, so as to not draw unwanted attention to the companion, the body-worn sensor system 100 is preferably attached to an existing head-worn accessory such as a baseball cap. The body-worn sensor system 100 may be of any color. In addition, the body-worn sensor system 100 may be made of a natural fabric, synthetic fabric, or a combination thereof. In one embodiment, the body-worn sensor system 100 is configured to be worn on the companion's head. However, in other embodiments, the body-worn sensor system 100 can be attached to the companion's head or body in any way desired as long as it can capture and record high fidelity movements of the companion's body.

Gyroscope

The gyroscope 110 is configured to detect, record and communicate to the blind user the velocity of the tilting and turning head movements of the companion wearing the body-worn sensor system 100. As used herein, tilting refers to up and down movement rotating about the x-axis, and turning refers to rotational movement in the XY-plane. In one embodiment, the gyroscope 110 is an electronic gyroscope, but in other embodiments, the gyroscope 110 may be any combination of sensing devices capable of reporting rotational velocity around a single axis or multiple axes. The gyroscope 110 is configured to register values of magnitude and direction of rotational movements. The magnitude indicates the speed of movement. When the companion's head starts tilting or turning, the gyroscope 110 is configured to begin registering an increasing numerical value for each corresponding axis (i.e., x-axis, y-axis, z-axis) in which the movement is taking place. The increase in the value registered by the gyroscope 110 stops when the movement stops, and the value then resets to zero. The decrease in value registered by the gyroscope 110 indicates that the movement has stopped.

Three variables are assigned for rotations about the axes of the gyroscope 110: GX, GY, and GZ. In one embodiment, GZ represents the speed of the horizontal sweep of the head, and GX represents the speed of the up or down rotation of the head. A threshold value is set for a minimum movement, in order to avoid receiving signals from trivial movements. The three functional axes can register data simultaneously.

Accelerometer

The accelerometer is configured to detect, record and communicate to the blind user the extent of the up, down, left and right tilting head movements of the companion. In one embodiment, the accelerometer 120 is an electronic accelerometer. However, in other embodiments, the accelerometer 120 may be any combination of sensing devices capable of reporting acceleration or tilt on a single axis or multiple axes. The accelerometer 120 is configured to provide positive and negative values, indicating a direction of movement for a respective axis (i.e., x-axis, y-axis, z-axis). Three variables are assigned for the axes of the accelerometer 120: AX, AY, and AZ. In one embodiment, AY represents the side-to-side tilt and AX represents the up or down tilt. In this embodiment, if the accelerometer 120 registers positive values for AY, the companion's head movement is tilting to the right, in the positive Y-direction. If the accelerometer 120 registers negative values for AY, the companion's head movement is tilting to the left, in the negative Y-direction. Similarly, if the accelerometer 120 registers positive values for AX, the companion's head movement is tilting down, in the positive X-direction. If the accelerometer 120 registers negative values for AX, the companion's head movement is tilting up in the negative X-direction.

The gyroscope 110 and the accelerometer 120 are configured to work simultaneously to measure the magnitude and direction of head-tilting movement. For example, the coding for the simultaneous function of the gyroscope 110 and the accelerometer 120 may take the following format:

---

If there is an activity with velocity above the threshold (indicated by the gyroscope)
    Then

```
Check if the accelerometer is registering negative or positive values.
    While head movement continues (indicated by the gyroscope)
        Do
Register extent of movement from accelerometer value.
    End
    Report extent of movement (indicated by final accelerometer
        value).
End
```

Further details regarding the cooperation of the gyroscope 110 and the accelerometer 120 will be discussed below.

X-Axis Tilt Using the Gyroscope and the Accelerometer

When the companion's head is in the process of tilting up or down, the gyroscope 110 will register positive values of magnitude on the x-axis, which will indicate the speed of movement. Simultaneously, the accelerometer 120 will register positive or negative values in the x-axis indicating the direction and extent of movement. When a head tilting activity takes place, the magnitude and direction (up or down) are recorded by the gyroscope 110 and accelerometer 120 respectively, in the form of Boolean and Scalar values, processed through a controller 300, and transmitted to the blind user's body-worn actuation system 200. The Boolean and Scalar values are transmitted to the blind user's body-worn actuation system 200 wirelessly, for example, through Bluetooth. Vertical actuators 211 on the body-worn actuation system 200 generate vibration stimuli in correspondence with the movement recorded through the body-worn sensor system 100, which will be described in further detail below.

XY-Plane Sweep Using the Gyroscope and the Magnetic Compass Sensor

When the companion's head is in the process of turning left/right around the z-axis, the gyroscope 110 will register positive magnitude values in the z-axis, which will indicate the speed of movement. The magnetic compass sensor 130 will register heading values indicating the direction the companion's head is facing. The long-term average of the companion's heading values over many seconds are used as a reference point for the companion's forward heading position. Deviations in heading from the companion's forward heading position value are used to determine the relative extent of the companion's turning head movement. When a head turning activity takes place, the magnitude and direction (left or right) are recorded by the gyroscope 110 and the magnetic compass sensor 130, respectively, in the form of Boolean and Scalar values, processed through the controller 300 and transmitted to the blind user's body-worn actuation system 200 wirelessly, for example, through Bluetooth. Horizontal actuators 212 on the body-worn actuation system 200 vibrate in correspondence with the movement recorded through the body-worn sensor system 100, which will be described in further detail below.

Vertical and horizontal movement of the companion's head is registered and transmitted simultaneously, allowing increased possibilities for representations of the movement in the body-worn actuation system 200.

Magnetic Compass Sensor

The magnetic compass sensor 130 is configured to detect, record and communicate to the blind user a precise direction that the companion is facing when the companion's head rotation movement in the X-Y plane stops. The magnetic compass sensor 130 may be an electromagnetic compass or any combination of devices capable of reporting absolute heading information. The magnetic compass sensor 130 is configured to be calibrated to magnetic north (or what is known as the magnetic declination of the companion's location). Once calibrated, the magnetic compass sensor will indicate the exact heading of the companion. The long-term average of the companion's heading values over many seconds are used as a reference point for the companion's forward heading position. Deviations in heading from the companion's forward heading position value are used to determine the relative extent of the companion's turning head movement Controller The controller 300 may be, for example, an Arduino, which is a single-board micro-controller including hardware comprising an open-source hardware board designed around an 8-bit Atmel AVR micro-controller, or a 32-bit Atmel ARM, and software comprising a standard programming language compiler and a boot loader that executes on the micro-controller. The controller 300 may include a computer-accessible medium 320 configured to store the information recorded by the gyroscope 110, the accelerometer 120 and the magnetic compass sensor 130, as well as configuration parameters for wireless communications and customization of signal processing performed on the recorded sensor data. The controller 300 will be described in further detail below.

The body-worn sensor system 100 collects, synchronizes and wirelessly transmits the stored X-axis tilt, XY-plane rotational sweep data and calibrated compass heading data to a controller 301 embedded in the body-worn actuation system 200 of the blind user. Since each of the gyroscope 110, the accelerometer 120 and the magnetic compass sensor 130 differs in its default axes, each set of axes must be mapped to match the coordinate system of the companion's head movements as shown in FIGS. 1A and 1B. For instance, according to the embodiment described above, rotation about the X-axis corresponds to the head tilting up and down, whereas rotation about the Z-axis corresponds to the turning sweep of the head. However, due to design differences or hardware orientation, the default axes of the particular gyroscope 110, the accelerometer 120 and the magnetic compass sensor 130 may correspond to different directions of movement.

Referring to FIGS. 2A and 2B, the illustrated implementation of a body-worn actuation system 200 includes an array of actuators 210 positioned along an arc extending from the left shoulder to the right shoulder and centered about the blind user's sternum. The array of actuators 210 includes vertical actuators 211 and horizontal actuators 212. The vertical actuators 211 are placed from top to bottom along the body-worn actuation system 200, centered at the blind user's sternum. The array of actuators 210 are configured to be selectively activated by control electronics 230 that are switched on and off by the controller 301 that receives and responds to the specific signals transmitted from the body-worn sensor system 100 in real time. The array of actuators 210 may be, for example, vibrational motors configured to impart vibrating stimuli at certain positions along the body-worn actuation system 200 based on the data received from the body-worn sensor system 100.

The body-worn actuation system 200 may also include an electronic switch 220 configured to turn on and off communication between the companion and the blind user. The switch may be, for example, a pressure sensor, a capacitance sensor, or a manually operated switch. The body-worn actuation system 200 may also include one or more portable power sources 250 configured to power the components of the body-worn actuation system 200. The portable power source 250 may include any combination of at least one single-use battery, at least one rechargeable battery, a system capable of generating or storing electrical power from the environment, temperature differentials, or harvested or stored kinetic or potential energy.

In one implementation, the body-worn actuation system 200 provides an indication of when the body-worn sensor system 100 is within a predetermined distance. In an alternative embodiment, the body-worn actuation system 200 provides an indication when the body-worn sensor system 100 is beyond a predetermined distance. It should be appreciated, that an indication may be provided to the body-worn sensor system 100 based on the distance between the body-worn actuation system 200 and the body-worn sensor system 100. Likewise, one or more of the body-worn sensor system 100 and the body-worn actuation system 200 may provide an indication if communication between the body-worn sensor system 100 and the body-worn actuation system 200 is lost and/or established.

The body-worn actuation system 200 be any type of actuation system worn by the blind user capable of representing sensor data from the body-worn sensor system 100 to the blind user. For example, the body-worn actuation system 200 may be embodied in a vest, a shirt, a dress, a necklace, glasses, sunglasses, a belt, a watch, shoes, etc. It may be preferable for the body-worn actuation system 200 to be a removable item of clothing or accessory, so that the blind user may remove the body-worn actuation system 200 and continue with his or her day without having to significantly change his or her outfit, once he or she is done interacting with the companion. The body-worn actuation system 200 may be of any color. In addition, the body-worn actuation system 200 may be made of a natural fabric, a synthetic fabric, or a combination thereof.

A controller 301 within the body-worn actuation system 200 connects to a wireless transceiver 240 configured to receive the X-axis tilt data, XY-plane rotational sweep data and compass heading data through the wireless transceiver 150 of the body-worn sensor system 100. The wireless transceiver 150 may be, for example, Bluetooth. The controller 301 is configured to activate the control electronics 230 to selectively provide power to the array of actuators 210 based on the Boolean and Scalar values received from the body-worn sensor system 100. The controller 301 may be, for example, an Arduino, which is a single-board micro-controller including hardware comprising an open-source hardware board designed around an 8-bit Atmel AVR microcontroller, or a 32-bit Atmel ARM, and software comprising a standard programming language compiler and a boot loader that executes on the micro-controller. The controller 301 may be the same as the controller 300 (see FIG. 3), except that in the controller 301, the computer-accessible medium 320 is configured to store and present the information received by the receiver from the body-worn sensor system 100, as well as configuration parameters for wireless data communications, actuator behavior, and customization of signal processing performed on the sensor data.

In one embodiment, the controller 301 is configured to activate the control electronics 230 to selectively provide power to the vertical actuators 211 based on the X-axis head tilt value received from the body-worn sensor system 100. The midpoint of the blind user's sternum serves as the zero position of the body-worn actuation system 200, with vibration occurring in the upper and lower vertical actuators 211 representing the companion's head tilting up or down, respectively. The further up or down the companion's head is tilted, the longer the upper or lower vertical actuators 211 will remain activated on the blind user's body-worn actuation system 200.

In the same embodiment, the controller 301 is configured to activate the control electronics 230 to selectively provide power to the horizontal actuators 212 based on the XY-plane head turning values received from the body-worn sensor system 100. The blind user's sternum serves as the zero position of the body-worn actuation system 200, with vibration occurring in the right or left direction. The further away from center the companion's head is turned, the further the vibrations will travel along the horizontal actuators 212 on the blind user's body-worn actuation system 200. For example, if the companion's head turns completely to the left, each horizontal actuator 212 from the sternum to the left shoulder will be activated sequentially. The furthest activated actuator will remain activated for a longer period of time to emphasize the extent of the companion's head turning.

While the array of actuators 210 are provided on a front side of the body-worn actuation system 200, the portable power source 250, the controller 301, the wireless transceiver 240, and the electronic switch 220 may be provided at the back side of the body-worn actuation system 200 and connected to the array of actuators 210 using conductive thread 213 or any other sufficiently flexible and durable conductive material.

The blind aid device 1000 described above, including body-worn sensor system 100 to be worn by the companion and the body-worn actuation system 200 to be worn by the blind user creates a familiar sphere around the blind user. Through the help of the companion, the blind user's attention can be directed to what might interest him, that he might otherwise not have known even exists. The blind aid device 1000 is intended for short term use, during the transitional period of adjustment of a user who has recently lost his sense of sight, until the user begins to compensate for the lack of the sense of sight. However, the blind aid device 1000 may be used over any period of time and for sessions of any duration. The blind aid device 1000 enables and enhances the life experiences of a user who has recently lost his sense of sight, by addressing his emotional needs and challenges with social interactions, as the user gets acclimated to the new way of life. In particular, the blind aid device 1000 gives a sense of perception of communication during social interactions by giving the blind user an additional sense of where his companion is looking, and directing the blind user where to look if he wishes to do so.

Although FIG. 3 illustrates an implementation of the controller 300 using a computer system, one of ordinary skill in the art will appreciate that the same computer system can be used in the implementation of the controller 301. As shown in FIG. 3, e.g., a computer-accessible medium 320 (e.g., as described herein, a storage device such as a hard disk, floppy disk, memory stick, CD-ROM, RAM, ROM, etc., or a collection thereof) can be provided (e.g., in communication with the processing arrangement 310). The computer-accessible medium 320 may be a non-transitory computer-accessible medium. The computer-accessible medium 320 can contain executable instructions 330 thereon. In addition or alternatively, a storage arrangement 340 can be provided separately from the computer-accessible medium 320, which can provide the instructions to the processing arrangement 310 so as to configure the processing arrangement to execute certain exemplary procedures, processes and methods, as described herein, for example.

The controller 300 may also include a display or output device, an input device such as a keyboard, mouse, touch screen or other input device, and may be connected to additional systems via a logical network. Many of the embodiments described herein may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art can appreciate that such network computing environments can typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, are intended to encompass implementations using one or more lines of software code, and/or hardware implementations, and/or equipment for receiving manual inputs.

The construction and arrangements of the blind aid device, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A blind aid device designed for non-verbal communication between a blind person and a companion comprising:
   a body-worn sensor system to be worn by the companion comprising
      a gyroscope configured to detect and record a velocity of tilting and turning head movements of the companion wearing the body-worn sensor system;
      an accelerometer configured to detect and record an extent of the tilting head movements of the companion; and
      a magnetic compass sensor configured to detect and record an extent of the turning head movement of the companion; and
   a wearable body-worn actuation system to be worn by the blind person comprising an array of control electronics and actuators configured to translate electronic signals transmitted from the body-worn sensor system into physical movements, in real time; and
   a wireless communication link between the body-worn sensor system and the wearable body-worn actuation system.

2. The device of claim 1, further comprising an electronic switch configured to turn on or turn off communication between the companion and the blind person, wherein the electronic switch is provided on one or both of the body-worn sensor system and the body-worn actuation system.

3. The device of claim 1, wherein the array of actuators are positioned along an arc extending from a left side to a right side of the wearable body-worn actuation system.

4. The device of claim 1, wherein the array of actuators further comprises:
a plurality of vertical actuators configured to sequentially activate and translate an up or down tilting head movement of the companion, the vertical actuators being arranged from a top to a bottom of the body-worn sensor system; and
a plurality of horizontal actuators configured to sequentially activate and translate a left or right turning head movement of the companion, the horizontal actuators being arranged from a left to a right of the body-worn sensor system,
wherein the vertical actuators and the horizontal actuators are centered at a sternum of the blind user.

5. The device of claim 1, further comprising control electronics configured to selectively activate the array of actuators based on specific signals transmitted from the body-worn sensor system in real time.

6. The device of claim 4, wherein a furthest activated vertical actuator, horizontal actuator or combination thereof will remain activated for a longer period of time to emphasize the extent of the tilting and/or turning head movement of the companion.

7. The device of claim 1, wherein X-axis tilt data detected by the gyroscope and the accelerometer is recorded and stored in the body-worn sensor system, and wirelessly communicated to the body-worn actuation system via Bluetooth.

8. The device of claim 1, wherein XY-plane rotational sweep data detected by the gyroscope and the magnetic compass sensor is recorded and stored in the body-worn sensor system, and wirelessly communicated to the body-worn actuation system via Bluetooth.

9. The device of claim 1, wherein compass heading data detected by the magnetic compass sensor is recorded and stored in the body-worn sensor system, and wirelessly communicated to the body-worn actuation system via Bluetooth.

10. The device of claim 2, wherein the switch is selected from the group consisting of a pressure sensor, a capacitance sensor, and a manually operated switch.

11. The device of claim 1, wherein the body-worn sensor system collects, synchronizes, and wirelessly transmits stored X-axis tilt data, XY-plane rotational sweep data and calibrated compass heading data to a controller embedded in the wearable body-worn actuation system of the blind person.

12. The device of claim 1, wherein the wearable body-worn actuation system is a removable item of clothing or accessory.

13. The device of claim 1, further comprising at least one power source configured to power the components of at least one of the body-worn sensor system and the wearable body-worn actuation system.

14. The device of claim 13, wherein the at least one power source comprises any combination of at least one single-use battery, at least one rechargeable battery, a system capable of generating or storing electrical power from the environment, temperature differentials, or harvested or stored kinetic or potential energy.

15. A blind aid device designed for non-verbal communication between a blind person and a companion comprising:
a body-worn sensor system to be worn by the companion comprising one or more of (a) a gyroscope configured to detect and record a velocity of tilting and turning head movements of the companion wearing the body-worn sensor system, (b) an accelerometer configured to detect and record an extent of the tilting head movements of the companion; and (c) a magnetic compass sensor configured to detect and record an extent of the turning head movement of the companion; and
a wearable body-worn actuation system to be worn by the blind person comprising an array of control electronics and actuators configured to translate electronic signals transmitted from the body-worn sensor system into physical movements, in real time, the wearable body-worn actuation system in communication with the body-worn sensor system.

16. The device of claim 15, wherein the array of actuators are positioned along an arc extending from a left side to a right side of the wearable body-worn actuation system.

17. The device of claim 15, wherein the array of actuators further comprises:
a plurality of vertical actuators configured to sequentially activate and translate an up or down tilting head movement of the companion, the vertical actuators being arranged from a top to a bottom of the body-worn sensor system; and
a plurality of horizontal actuators configured to sequentially activate and translate a left or right turning head movement of the companion, the horizontal actuators being arranged from a left to a right of the body-worn sensor system,
wherein the vertical actuators and the horizontal actuators are centered at a sternum of the blind user.

18. The device of claim 15, further comprising control electronics configured to selectively activate the array of actuators based on specific signals transmitted from the body-worn sensor system in real time.

19. The device of claim 15, wherein X-axis tilt data detected by the gyroscope and the accelerometer is recorded and stored in the body-worn sensor system, and wirelessly communicated to the body-worn actuation system via Bluetooth.

* * * * *